United States Patent
Lange et al.

(10) Patent No.: US 11,342,860 B2
(45) Date of Patent: May 24, 2022

(54) GROUP OF DC LINK CONVERTERS HAVING DELIBERATE COUPLING OF THE DC LINK CONVERTERS TO EACH OTHER

(71) Applicant: Siemens Aktiengesellschaft, Munich (DE)

(72) Inventors: Robert Lange, Crimmitschau (DE); Marco Seja, Rossau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/767,399

(22) PCT Filed: Nov. 15, 2018

(86) PCT No.: PCT/EP2018/081343
§ 371 (c)(1),
(2) Date: May 27, 2020

(87) PCT Pub. No.: WO2019/105745
PCT Pub. Date: Jun. 9, 2019

(65) Prior Publication Data
US 2021/0006176 A1    Jan. 7, 2021

(30) Foreign Application Priority Data
Nov. 28, 2017  (EP) .................................... 17203953

(51) Int. Cl.
*H02M 5/458*       (2006.01)
*H02M 1/32*        (2007.01)
(Continued)

(52) U.S. Cl.
CPC ............. *H02M 5/458* (2013.01); *H02M 1/32* (2013.01); *H02M 1/0067* (2021.05); *H02M 3/1584* (2013.01); *H02M 5/4585* (2013.01)

(58) Field of Classification Search
CPC .... H02M 5/4585; H02M 3/1584; H02M 1/32; H02M 1/0067; H02M 5/458
See application file for complete search history.

(56) References Cited

U.S. PATENT DOCUMENTS

| 2013/0020989 A1 | 1/2013 | Xia et al. |
| 2017/0229994 A1* | 8/2017 | Sawamura ............. H02M 7/06 |

FOREIGN PATENT DOCUMENTS

| CN | 101499771 A * | 8/2009 |
| CN | 101499771 A   | 8/2009 |

(Continued)

OTHER PUBLICATIONS

PCT International Search Report dated Jan. 31, 2019 corresponding to PCT International Application No. PCT/EP2018/081343 filed Nov. 15, 2018.

*Primary Examiner* — Jue Zhang
(74) *Attorney, Agent, or Firm* — Henry M. Feiereisen LLC

(57) ABSTRACT

Several DC link converters are interconnected at first and second terminals. Each DC link converter has an input-side rectifier connected to a power supply and an output-side inverter connected to a load, and a DC link with a DC link capacitor. Potentials of the DC link capacitor are connected via first and second lines respective first and second terminals. A switching element and a parallel-connected diode are arranged in at least one of the lines. A control device controls the switching element depending on the DC link voltage and/or as the current flowing through the respective line, allowing the DC link capacitor to be charged, but not discharged via the diode when the switching element is non-conducting, and to be at least discharged when the switching element is conducting. An inductor is arranged in at least one of the lines, and a flyback diode is connected between the lines.

14 Claims, 3 Drawing Sheets

(51) Int. Cl.
*H02M 3/158* (2006.01)
*H02M 1/00* (2006.01)

(56) References Cited

FOREIGN PATENT DOCUMENTS

| | | |
|---|---|---|
| DE | 102014114248 A1 | 3/2016 |
| JP | H10164862 A | 6/1998 |
| JP | 2005176475 A | 6/2005 |

\* cited by examiner

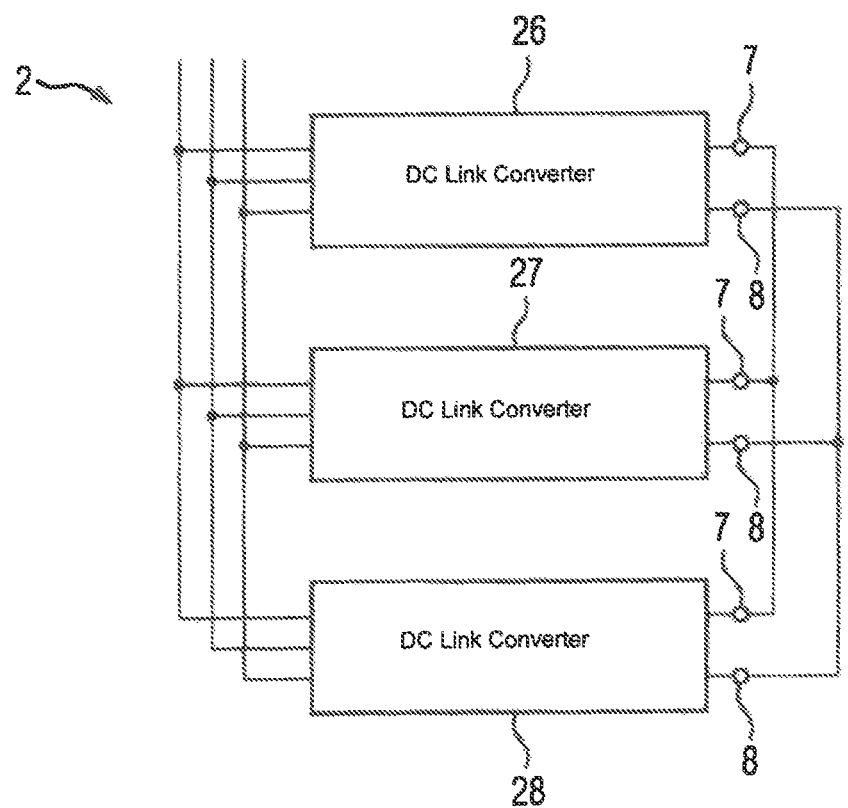

GROUP OF DC LINK CONVERTERS HAVING DELIBERATE COUPLING OF THE DC LINK CONVERTERS TO EACH OTHER

CROSS-REFERENCES TO RELATED APPLICATIONS

This application is the U.S. National Stage of International Application No, PCT/EP2018/081343, filed Nov. 15, 2018, which designated the United States and has been published as International Publication No. WO 2019/105745 A1 and which claims the priority of European Patent Application, Serial No. 17203953.9, filed Nov. 28, 2017, pursuant to 35 U.S.C. 119(a)-(d).

BACKGROUND OF THE INVENTION

The present invention is based on a group of DC link converters,
 wherein the DC link converters each have a DC link with a DC link capacitor,
 wherein the DC link converters and with them the DC link capacitors are connected to a power supply via a respective input-side rectifier and are connected to a respective load via a respective output-side inverter,
 wherein the DC link converters each have a first and a second terminal, which are connected to a respective first and a respective second potential of the respective DC link via a respective first and a respective second line, Electrical devices, for instance larger electrically driven machines, often have a plurality of electrical consumers (loads), In many cases the loads are supplied with electrical energy from a shared electrical supply network via a respective DC link converter, For supply with electrical energy the rectifiers are connected to the electrical supply network.

In some cases the loads do not operate permanently as consumers, but instead at times also as energy providers, One example are electrical drives, which are used to brake a moving mass. In cases of this type, energy is fed back into the DC link by correspondingly controlling the inverter. In some cases the rectifier is embodied as a controlled rectifier. In this case the energy fed back into the DC link can also be fed back into the supply network via the rectifier. In other cases, the rectifier is however embodied as an uncontrolled rectifier, in particular as a simple diode bridge rectifier. In these cases the electrical energy must otherwise be discharged from the DC link.

One possibility consists in connecting what are known as brake resistors to the DC link, in which brake resistors the fed-back electrical energy is converted into heat. A number of DC links arranged in parallel are often present, however, In this case, the first potentials of the DC links and the second potentials of the DC links can be connected to one another. As a result, energy can flow from one of the DC links into another DC link, so that the electrical energy fed back into the one of the DC links can be received by the other DC link and forwarded to its load.

In the simplest case, the first potential of the DC links and the second potential of the DC links connect to one another directly. This embodiment has a very high dynamic. When the rectifier is connected to the supply network, it is however no longer ensured in a defined manner that each DC link is charged via its rectifier. The reasons for this are component tolerances, in the case of identically designed and dimensioned DC link converters, and in addition different characteristic curves of the used components in the case of differently dimensioned or differently designed DC link converters, When the shared power supply is connected, undefined states of this type can result in a number of DC links being charged completely or at least essentially via the rectifier of an individual DC link converter. This makes it possible for the rectifier of this DC link converter to be overloaded and damaged or destroyed.

In order to avoid such damage, different procedures are known.

A known procedure consists in designing components of the DC link converters, in particular the rectifiers, to be oversized. This procedure results in safer operation per se but incurs increased costs. Furthermore, in the case of a direct connection, high compensating currents can flow into the connecting lines, which can result in further devices being destroyed and, in some instances, even in fires.

A further known procedure consists in arranging resistors in the connecting lines between the first and the second potentials of the DC links. The resistors can be in particular PTC resistors (PTC positive temperature coefficient), i.e. resistors, the resistance value of which increases significantly when heated. This procedure nevertheless protects the rectifiers and also the remaining components of the DC link converters from overload, but results in relatively small dynamics and in high power losses across the resistors.

A further possibility consists in replacing the resistors by means of parallel circuits of diodes, wherein the diodes of the respective parallel circuit conduct in the opposite direction. This procedure results in relatively minimal power losses, but is, however, in particular not short-circuit proof.

One further possibility consists in assigning throttles to the rectifiers with respect to the supply network. This procedure protects the rectifiers but causes power losses outside of the DC link converters. Furthermore, this embodiment is also not short-circuit proof, US 2017/0 229 994 A1 discloses a DC link converter. This DC link converter has a DC link with a DC link capacitor. The DC link converter and with it the DC link capacitor is connected to a power supply via an input-side rectifier and to a load via an output-side inverter. The DC link converter has a first and a second terminal, which are connected to a first and a second potential of the DC link via a first and a second line. A first switching element is arranged in the first line, a first diode being connected in parallel thereto. When the first switching element is open, the DC link capacitor can be charged via the first diode but cannot discharge. When the first switching element is closed, the DC link capacitor can be (minimally) discharged via the first switching element. The DC link converter has a control device which controls the first switching element as a function of a DC link voltage prevailing in the DC link. The control device also controls a second switching element contrary to the first switching element. A second diode is connected in parallel with the second switching element. A series connection between an inductor and a capacitor is alternately connected to the DC link via the two switching elements.

A similar disclosure can be taken from JP H10 164 862 A.

The object of the present invention consists in creating possibilities, by means of which both an individual, independent operation of the DC link converter and also an equalization of load between the DC link converters is possible in a simple and reliable manner.

SUMMARY OF THE INVENTION

The object is achieved in accordance with the invention by a group of DC link converters which is embodied in that, the DC links anad with them the DC link capacitors are connected to a power supply via a respective input-side rectifier and are connected to a respective load via a respective output-side inverter, the DC converters in each case have a first and a second terminal, which are connected to a respective first and a respective second potential of the respective DC link via a respective first and a respective second line, a respective first switching element is arranged in the respective first line, a respective first diode being connected in parallel therewith so that when the respective first switching element is open, the respective DC link capacitor can be charged via the respective first diode, but cannot discharge, and when the respective first switching element is closed, the respective DC link capacitor can at least be discharged via the respective first switching element, the respective DC link converter has a respective control device, which controls the respective first switching element as a function of a respective DC link voltage prevailing in the respective DC link, a respective first inductor is arranged in the respective first line between the respective first switching element and the respective first terminal, the respective DC link converter has a respective flyback diode, which connects the respective first and the respective second line to one another, a respective first diode nodal point, to which the respective flyback diode with the respective first line is connected, is arranged between the respective first switching element and the respective first inductor, and the first terminals of the DC link converter are connected to one another and the second terminals of the DC link converter are connected to one another.

Advantageous embodiments of the group of DC link converters form the subject matter of the dependent claims.

While the respective first switching element remains open, the respective DC link converter is operated independently of the other DC link converters, the first and second potentials of which are connected to the first and the second terminal of the cited DC link converter. Depending on the degree to which the respective first switching element is dosed, an energy flow out of the respective DC link to the DC links of the other DC link converter is possible, however. This makes it possible to decouple the DC link of the corresponding DC link converter as required from the DC links of the other DC link converter or to couple the same thereto.

It is possible for the terminals to be internal, rather notional terminals. It is also possible, however, for the terminals to be externally accessible terminals, to which a line can be connected in a detachable manner in each case. Examples of terminals of this type are screw terminals, sockets, insulation displacement terminations and suchlike.

In the simplest case, the control device of at least one of the DC link converters controls its first switching dement exclusively as a function of the DC link voltage prevailing in the DC link of this DC link converter. In particular, the control device can dose or interconnect the first switching element, if the DC link voltage, in other words the difference between the first and the second potential of this DC link, exceeds a predetermined value. The duty cycle, in other words the percentage share in a period, during which the control device doses the first switching element, can be determined by the control device on the basis of a predetermined function, to which the DC link voltage is supplied as an input parameter and which supplies the duty cycle as an output parameter.

Alternatively it is possible for the control device of at least one of the DC link converters to control its first switching element as a function of the DC link voltage prevailing in the DC link of this DC link converter and additionally as a function of a current flowing via the first line or the second line of this DC link converter. For instance, the control device can decide as a function of the DC link voltage whether it actually closes the first switching element and can reopen the first switching element in each case if the current taken from the DC link exceeds a predetermined value. As a result, depending on the measuring point for the current, a component protection can be realized or a defined energy compensation between the DC links can be realized by means of prompt regulation when a critical current is reached, for instance.

It is also possible for the control device of this DC link converter to control its first switching element as a function of the product of the DC link voltage prevailing in the DC link of this DC link converter and the current flowing via the first line or the second line of this DC link converter. In this case, as a function of the DC link voltage, the control device can decide for example whether it actually doses the first switching element and can reopen the first switching element if the power taken from the DC link exceeds a predetermined value.

In the simplest case, the second lines, connected to the second potential of the respective DC link, are simple, direct connections between the respective second terminal and the respective DC link. Provision is preferably made, however for a second switching element to be arranged in the second line of at least one of the DC link converters, a second diode being connected in parallel therewith, so that when the second switching element is open, the DC link capacitor of this DC link converter can be charged via the second diode, but cannot be discharged and when the second switching element is closed the DC link capacitor of this DC link converter can at least be discharged via the second switching element, for the control device of this DC link converter also to control the second switching element as a function of the DC link voltage prevailing in the DC link of this DC link converter in addition to the first switching element of this DC link converter and for a second diode nodal point, to which the flyback diode of this DC link converter with the second line of this DC link converter is connected, to be arranged between the second terminal of this DC link converter and a second switching element.

As a result, a two-pole separation of the DC link from the terminals is possible. The operational safety is increased as a result.

The control device of this DC link converter preferably controls the second switching element in the same way as the first switching element of this DC link converter. If the control device opens the first switching element, it also opens the second switching element. The same applies to closing the switching elements.

A second inductor is preferably arranged in the second line of this DC link converter between the second diode nodal point and the second terminal of this DC link converter. This produces a symmetrical design of the DC link converter. In the presence of the second inductor, the first inductor and the second inductor can be coupled magnetically to one another. Alternatively, they can be embodied as individual inductors.

Provision is preferably made
for this DC link converter to have an additional capacitor, which connects the first and the second line of this DC link converter to one another,
for a first capacitor nodal point, to which the additional capacitor with the first line of this DC link converter is connected, to be arranged between the first terminal and the first inductor of this DC link converter and for a second capacitor nodal point, to which the additional capacitor with the second line of this DC link converter is connected, to be arranged between the second terminal of this DC link converter and the second inductor.

This embodiment can in principle also then be realized if the second inductor is not present. In this case, the second capacitor nodal point is arranged between the second terminal and the second diode nodal point. If the second switching element and the second diode are also omitted, the second capacitor nodal point can be connected to the second line at any point.

It is possible for the first diode connected in parallel with the first switching elements to be an independent, separately present diode. The first diode of at least one of the DC link converters is preferably a diode which is intrinsic to the first switching element of this DC link converter, however. The same applies, if present, to a second diode connected in parallel to a second switching element.

The input-side rectifiers can be embodied as controlled rectifiers. The input-side rectifier of at least one of the DC link converters is preferably embodied as an uncontrolled rectifier, however.

BRIEF DESCRIPTION OF THE DRAWING

The properties, features and advantages of this invention described above as well as the manner in which they are achieved will become clearer and more comprehensible in conjunction with the following description of the exemplary embodiments, which are explained in more detail in conjunction with the drawings, which show, in a schematic representation:

FIG. 3 shows a group of DC link converters.

DETAILED DESCRIPTION OF PREFERRED EMBODIMENTS

Figure 1:
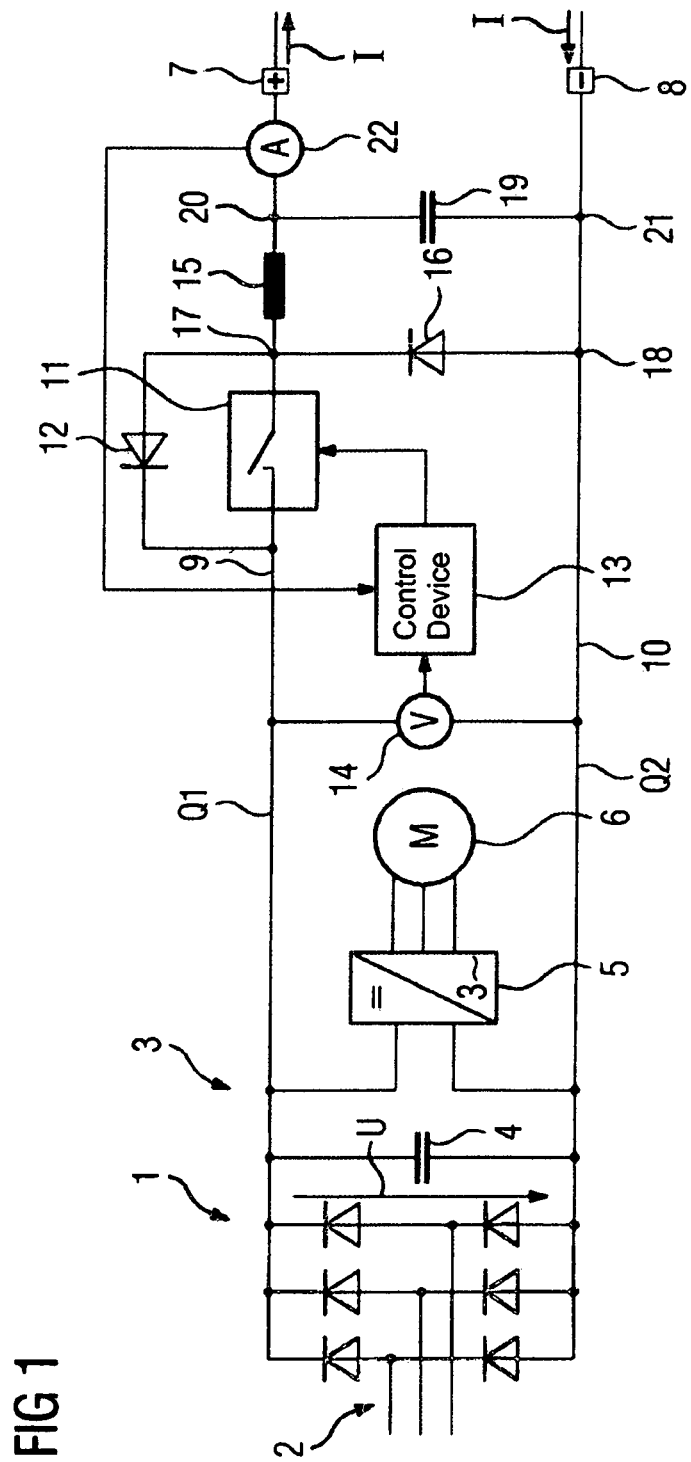
FIG. 1 shows a DC link converter.

FIG. 1 shows a basic embodiment of a DC link converter.
According to FIG. 1, the DC link converter has an input-side rectifier 1. The input-side rectifier 1 is connected to an input-side power supply 2, for instance a typical three-phase power system with a nominal voltage of, for instance, 400 V or 690 V. The rectifier 1 is generally embodied as an uncontrolled rectifier, in other words as a pure diode rectifier. The rectifier 1 can in principle also be embodied as a controlled converter with the ability to feed back.

A DC link 3 is connected to the power supply 2 by way of the input-side rectifier 1, The DC link 3 has inter glia a DC link capacitor 4. The DC link capacitor 4 is thus also connected to the power supply 2 via the input-side rectifier 1.

The DC link converter also has an output-side inverter 5. The DC link 3 and the DC link capacitor 4 are connected to a load 6, for instance an electric machine, via the output side inverter 5.

The DC link converter generally also has a charging circuit between the input-side rectifier 1 and the DC link capacitor 4, which consists of a resistor and a switch connected in parallel to the resistor. When the power supply 2 is connected, the switch is initially opened so that the DC link capacitor 4 is only charged via the resistor and thus in a current-limiting manner. This prevents the input-side rectifier 1 from overloading. After partial or complete charging of the DC link capacitor 4, the switch is closed so that the DC link capacitor 4 is no longer connected in a low-resistance manner to the input-side rectifier 1. The charging circuit and operation of the charging circuit are generally known to the persons skilled in the art. Within the scope of the present invention, however, they are of less importance and are therefore not shown in the HG.

During operation the DC link 3 has a first potential Q1 and a second potential Q2. The difference in the potentials Q1 and Q2 corresponds to the DC link voltage U=Q1−Q2.

The DC link converter further has a first terminal 7 and a second terminal 8. The first terminal 7 is connected to the first potential Q1 of the DC link 3 by way of a first line 9. The second terminal 8 is connected to the second potential Q2 of the DC link via a second line 10.

In the fundamental embodiment according to FIG. 1, the connection of the second terminal 8 with the second potential Q2 can be direct. A first switching element 11 is arranged in the first line 9, however, The first switching element 11 can be a MOSFET, for instance, A first diode 12 is connected in parallel with the first switching element 11. The first diode 12 is connected (poled) so that the DC link capacitor 4 can be charged via the first diode 12 but cannot be discharged. When, as shown in FIG. 1, the first potential Q1 is greater than the second potential Q2, the cathode of the first diode 12 is therefore arranged with respect to the DC link 3, and the anode with respect to the first terminal 7. When the first switching element 11 is opened (so that it can therefore not conduct current), the DC link 3 and with it the DC link capacitor 4 can be charged from the terminals 7, 8 via the first diode 12 but cannot discharge. The first diode 12 can be an independent diode, in other words a component which differs from the first switching element 11. However, the first diode 12 is generally a diode which is intrinsic to the first switching element 11.

The DC link converter further has a control device 13, which controls the first switching element 11. Depending on the control state, the first switching element 11 is either completely opened or blocked, (no current flow is possible) or completely dosed or interconnected (current flow is possible). In the interconnected state, at least one current flow is possible via the first switching element 11 so that the DC link 3 and with it the DC link capacitor 4 can be discharged via the first switching element 11. In some embodiments of the first switching element 11, even a current flow in both directions is possible.

The DC link voltage U prevailing in the DC link 3 is detected by means of a voltage meter 14. The detected voltage value is fed to the control device 13. The control device 13 controls the first switching element 11 as a function of the detected voltage value U. In particular, the control device 13 can compare the detected voltage value U with a predetermined voltage value U0. If the detected voltage value U is smaller than the predetermined voltage value U0, the first switching element 11 remains open or blocked. If the detected voltage value U is greater than the predetermined voltage value U0, the first switching element 11 is temporarily or permanently closed, until the detected voltage value U reduces again to below the predetermined voltage value U0, An increase in the DC link voltage U may occur in particular if the load 6 is embodied as an electric machine, which can operate temporarily in generator operation, The predetermined voltage value U0 is suitably fixed. It may in particular be marginally greater than the nominal voltage which is to prevail in the DC link 3. In particular, the predetermined voltage value U0 should be determined so that the first switching element 11 remains open when the power supply 2 is connected to the DC link converter, in other words when the DC link 3 is charged to its nominal voltage. This means that the energy fed into the DC link 3 via the input-side rectifier 1 is not fed via the terminals 7, 8 to other devices connected to the terminals 7, 8, for instance the DC links of other DC link converters.

In order to limit the current increase when the first switching element 11 is closed or interconnected, a first inductor 15 is arranged in the first line 9 between the first switching element 11 and the first terminal 7. Furthermore, the DC link converter has a flyback diode 16, which connects the first and the second line 9, 10 to one another. The flyback diode 16 is connected with the first line 9 to a first diode nodal point 17, with the second line 10 to a second diode nodal point 18. The first diode nodal point 17 is arranged between the first switching element 11 and the first inductor 15. The second diode nodal point 18 can in principle be connected to the second line 10 at any point.

The DC link converter generally has an additional capacitor 19, which likewise connects the first and the second line 9, 10 to one another. The additional capacitor 19 is connected with the first line 9 to a first capacitor nodal point 20, with the second line 10 to a second capacitor nodal point 21. In this case, the first capacitor nodal point 20 is arranged between the first terminal 7 and the first inductor 15. The second capacitor nodal point 21 is generally arranged between the second terminal 8 and the second diode nodal point 18.

The DC link converter can also have a second inductor (not shown in FIG. 1), If the second inductor is present, it is arranged in the second line 10 between the second terminal 8 and the second diode nodal point 18. When the second inductor is present in addition to the additional capacitor 19, it is arranged in the second line 10 between the second capacitor nodal point 21 and the second diode nodal point 18.

The first inductor 15 and the flyback diode 16 interact, possibly assisted by the additional capacitor 19 and/or the second inductor, with the first switching element 11 in the manner of a switching power supply. When the first switching element 11 is closed, a current I can flow in the first line 9. In this state the current I flows via the first switching element 11. On account of the first inductor 15 and possibly also the second inductor, the current I does not increase abruptly but instead just gradually, When, conversely, the first switching element 11 is opened, the current I is driven through the first inductor 15 and possibly also the second inductor. The current I therefore does not drop abruptly but only gradually. In this state the current I flows via the flyback diode 16.

In the simplest case, it is possible for the control device 13 to determine the control of the first switching element 11 exclusively as a function of the DC link voltage U prevailing in the DC link 3 and to control the first switching element 11 accordingly. For instance the control device 13 can remain permanently open while the DC link voltage U lies below the predetermined voltage value U0. As soon as the DC link voltage U exceeds the predetermined voltage value U0, the switching element 11 is however controlled with a fixed duty factor V. If the duty factor V is below 1, the switching element 11 is closed periodically during first times T1 and opened during second times T2, wherein the relationship $V=T1/(T1+T2)$ applies.

If the duty factor V is 1, the first switching element 11 remains permanently closed. A duty factor V of 0, in other words the first switching element 11 remains permanently open, only occurs when the DC link voltage U is below the predetermined voltage value U0.

In connection with FIG. 1 one possible embodiment is then explained, in which the control device 13 controls the first switching element 11 not only as a function of the DC link voltage U but instead also additionally takes the current I flowing in the first line 9 into account, In this case a flowmeter 22 is additionally present. According to the diagram in FIG. 1, the flowmeter 22 can be arranged in the vicinity of the first terminal 7 in the first line 9, in particular between the first capacitor nodal point 20 and the first terminal 7. The flowmeter 22 can however also be arranged at another point in the first line 9, for instance between the DC link capacitor 4 and the first switching element 11. Similarly the flowmeter 22 can alternatively be arranged in the second line 10.

The flowmeter 22 detects the current I and supplies a corresponding measured value to the control device 13. In this case, the control device 13 controls the first switching element 11 as a function of the detected voltage value U and as a function of the detected current value I. In this case, the voltage value U can be decisive (in a purely binary manner) in determining whether the first switching element 11 is actually closed, for instance. In particular, in this case the first switching element 11 remains open or blocked, when and while the detected voltage value U is smaller than the predetermined voltage value U0. If the detected voltage value U is by contrast larger than the predetermined voltage value U0, the first switching element 11 is temporarily closed and reopened until the detected voltage value U drops again to below the predetermined voltage value U0. In particular, the control device 13 can close the first switching element 11 and then keep it closed until the current I is raised to an upper limit value. Then the control device 13 opens the first switching element 11 and then keeps it open until the current I has dropped to a lower limit value. In this case the duty factor V is therefore not determined at the outset, but is instead produced by the current I.

It is also possible for the control device 13 to control the first switching element 11 as a function of the product of the DC link voltage U with the current I. In particular, it is possible for the control device 13 to keep the first switching element 11 opened or blocked when and while the detected voltage value U is smaller than the predetermined voltage value U0. If, conversely, the detected voltage value U is greater than the predetermined voltage value U0, the first switching element 11 is temporarily closed and reopened, until the detected voltage value U drops again to below the predetermined voltage value U0. In particular, the control device 13 can close the first switching element 11 and then keep it closed until the product of the DC link voltage U with the current I is increased to an upper limit value. The control device 13 then opens the first switching element 11 and subsequently keeps it open until the product of the DC link voltage U with the current I has dropped to a lower limit value. In this case the duty factor V is therefore also not determined at the outset, but is instead produced by the product of the DC link voltage U with the current I, A further embodiment of the DC link converter is then explained in conjunction with FIG. 2. The embodiment according to FIG. 2 builds on the embodiment in FIG 1. The elements 1 to 22 there are therefore not explained again.

Figure 2:
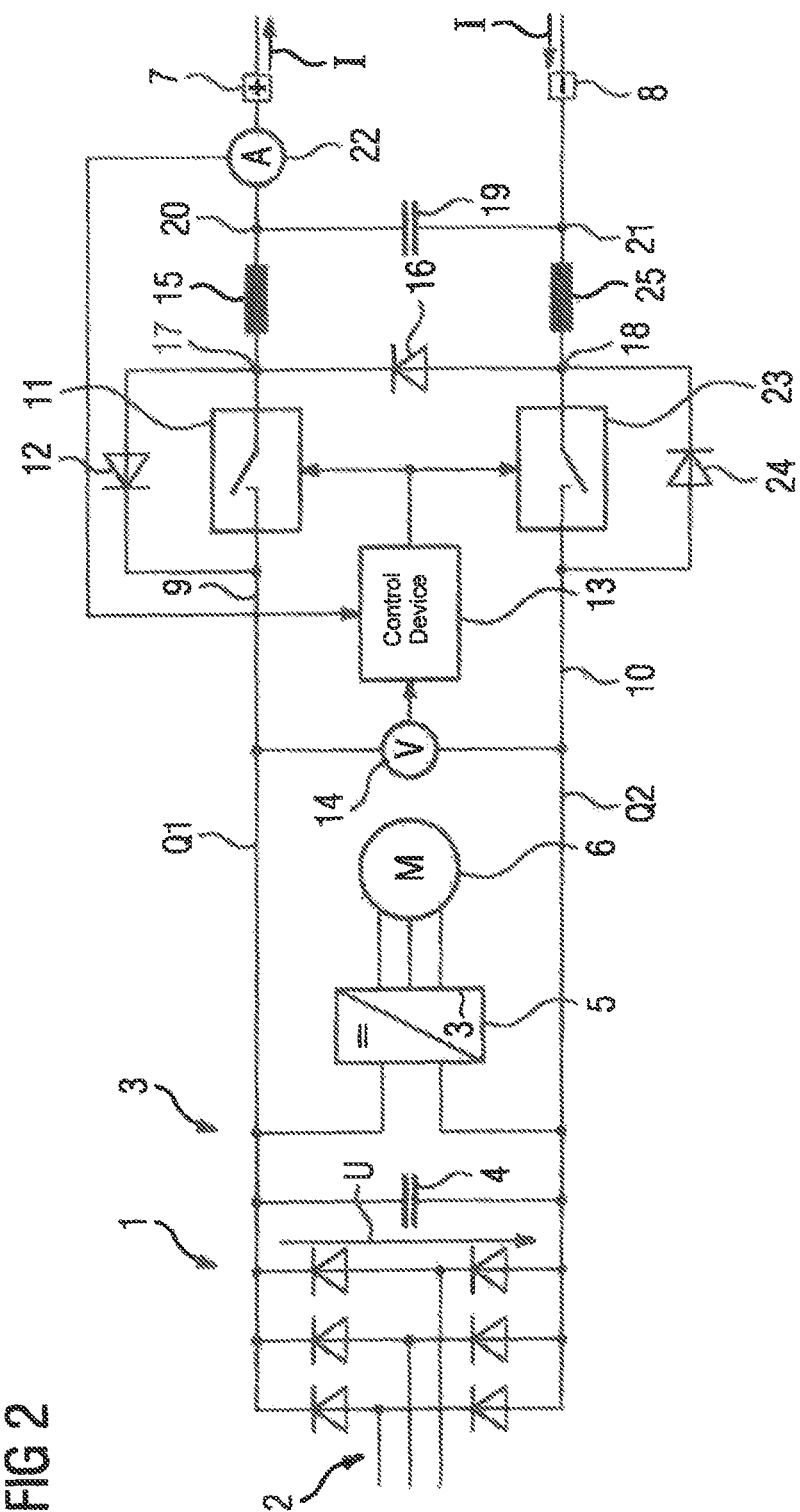
FIG. 2 shows a further DC link converter.

According to FIG. 2, the first switching element 11 is not only arranged in the first line 9, but a second switching element 23 is instead additionally arranged in the second line 10. The second switching element 23 can, similarly to the first switching element 11, be a MOSFET, for instance. In a similar manner to the first switching element 11, a second diode 24 is connected in parallel to the second switching element 23. The second diode 24 is connected in a similar manner to the first diode 12 in that the DC link capacitor 4 can be charged via the second diode 24 but cannot be discharged.

When, as shown in FIG. 2 (and also in FIG. 1), the first potential Q1 is greater than the second potential Q2, the anode of the second diode 24 is therefore arranged with respect to the DC link 3, and the cathode with respect to the second terminal 8. When the second switching element 23 is opened, the DC link 3 and with it the DC link capacitor 4 can be charged from the terminals 7, 8 via the second diode 24 but cannot discharge. The second diode 24 can be a separate diode, in other words a component which differs from the second switching element 23. The second diode 24, similarly to the first diode 12, is however generally a diode which is intrinsic to the second switching element 23. In the case of the embodiment according to FIG. 3, the second diode nodal point 18 is connected between the second terminal 8 and the second switching element 23 to the second line 10. If the additional capacitor 19 is present, the second capacitor nodal point 21 is preferably also arranged between the second terminal 8 and the second diode nodal point 18.

Preferably, but not imperatively, a second inductor 25 is also arranged in the second line 10. In this case the second inductor 25 is arranged between the second diode nodal point 18 and the second terminal. If the additional capacitor 19 is additionally also present, the second capacitor nodal point 21 is arranged between the second terminal 8 and the second inductor 25.

In the presence of the second switching element 23, the control device 13, in addition to the first switching element 11, also controls the second switching element 23 as a function of the DC link voltage U. In this regard a similar control preferably takes place. At any time at which the control device 13 interconnects the first switching element 11, it therefore preferably also interconnects the second switching element 23, Similarly the control device 13 preferably also blocks the second switching element 23 at any time at which it blocks the first switching element 11, The embodiments above also apply to FIG. 1. It is therefore possible to control both the second switching element 23 exclusively as a function of the DC link voltage U and also as a function of both the DC link voltage U and also the current I, also as a function of the product of DC link voltage U and current I.

In accordance with the representation in FIG. 3, a number of DC link converters are present. The DC link converters are only shown schematically in FIG. 3. They are in particular embodied as explained above in conjunction with FIGS. 1 and 2. The DC link converters need not be embodied similarly. It is possible for the DC link converters to implement different embodiments of the present invention, Three DC link converters which are provided with the reference characters 26, 27 and 28 are shown purely by way of example in FIG. 3. Two or conversely more than three DC link converters could however also be present.

According to FIG. 3, the first terminals 7 of the DC link converter 26, 27, 28 are connected to one another. Similarly, the second terminals 8 of the DC link converter 26, 27, 28 are also connected to one another. As a result in the event that the DC link voltage U there increases in one of the DC link converters 26, 27, 28, for instance in the DC link converter 26, due to a feedback by the load 6 there, energy can be taken from the DC link 3 of this DC link converter by correspondingly controlling the switching elements 11, 23 of this DC link converter and be fed to the DC links 3 of the other DC link converters, for instance the DC links 3 of the DC link converters 27 and 28, In summary, the present invention therefore relates to the following facts:

DC link converters have DC links 3 with DC link capacitors 4, which are connected to a power supply 2 via rectifiers 1 and to loads 6 via inverters 5. The DC link converters have two terminals 7, 8, which are connected to the potentials Q1, Q2 of the DC links 3 via lines 9, 10. A switching element 11, to which a diode 12 is connected in parallel, is arranged in each one of the lines 9. As a result, when the switching elements 11 are opened, the DC link capacitors 4 can be charged via the diodes 12 but cannot discharge. With closed switching elements 11, the DC link capacitors 4 can at least be discharged via the switching elements 11. The DC link converters have control devices 13, which control the switching elements 11 as a function of the DC link voltages U, Inductors 15 are arranged in the lines 9 between the switching elements 11 and the terminals 7. The DC link converters have flyback diodes 16 which connect the lines 9, 10 to one another. Diode nodal points 20, at which the flyback diodes 16 are connected to the respective one line 9, are arranged between the switching elements 11 and the inductors 15. Similar terminals of the DC link converters are connected to one another The present invention has many advantages. In particular, a number of DC link converters 26, 27, 28 connected to one another via their terminals 7, 8 are operated independently of one another during normal operation. Normal operation comprises connection to the power supply 2, the continuous feed via the power supply 2 and also the renewed connection of the power supply, for instance after a brief interruption. Also no compensating currents flow between the DC link converters 26, 27, 28 h the case of very different loads and also with the occurrence of a short circuit, The thermal bad of the used components of the DC link converters 26, 27, 28 can be reduced and thus the service life of the components can be increased. Coupling of the DC link converters 26, 27, 28 only then occurs if an increased DC link voltage U occurs in one of the DC link converters 26, 27, 28. In this case, excess energy need not be converted into heat, but can instead be fed to one of the other DC link converters 26, 27, 28 and used there. The DC link converters 26, 27, 28 can be dimensioned and designed independently of one another. An overdimensioning is no longer required. The characteristics of the control device 13 of the respective DC link converter 26, 27, 28 can be adjusted individually and very flexibly to the operating conditions and also to the efficiency of the switches 11, 23, Although the invention has been illustrated and described in greater detail by the preferred exemplary embodiment, the invention is not limited by the disclosed examples and other variations may be derived herefrom by the person skilled in the art without departing from the scope of protection of the invention.

What is claimed is:

1. A group compilsed of a plurality of interconnected DC link converters, each of the interconnected DC link converter comprising:
an input-side rectifier having an AC input connected to a power supply and an output-side inverter having an AC output connected to a load, with a DC output of the input-side rectifier and a DC innut of the output-side inverter connected to one another via a DC link having a DC link capacitor, wherein the DC link has a first potential and a second potential defining a DC link vdtage,
a first terminal and a second terminal,
a first switching element and a first diode connected in parallel between the first potential and the first terminal, with the first switching element connected so that when the first switching element is non-conducting, the DC link capacitor can be charged via the first diode but cannot be discharged, and when the first switching element is conducting, the DC link capacitor can at least be discharged via the first switching element,
wherein the first terminals of the plurality of DC link converters are, connected to one another, and the second terminals of the plurality of DC link converters are connected to one another, and
a control device controlling the first switching element as a function of the DC link voltage, such that enemy can be removed from the DC link of at least one of the plurality of interconnected DC link converter by controlling the first of the at least one DC link converter and supplied to the DC link of another of the plurality of interconnected DC link converters.

2. The group of claim 1, wherein the control device controls the first switching element exclusively as a function of the DC link voltage.

3. The group of claim 1, wherein the control device controls the first switching element additionally as a function of a current flowing through one of the first and second terminals.

4. The group of claim 1, wherein the control device controls the first switching element as a function of a product of the DC link voltage and the current.

5. The group of claim 1, further comprising:
a second switching element and a second diode connected in parallel with the second switching element between the second potential and the second terminal so that when the second switching element is non-conducting, the DC link capacitor can be charged via the second diode but cannot be discharged, and when the second switching element is conducting, the DC link capacitor can at least be discharged via the second switching element,
wherein the control device controls the second switching element as a function of the DC link voltage of the DC link.

6. The group of claim 5, wherein the control device controls the second switching element in similar manner as the first switching element.

7. The group of claim 5, wherein at least one of the plurality of the DC link converters comprises an additional capacitor connected across the first and the second terminals.

8. The group of claim 5, wherein the second diode connected in parallel with the second switching element is intrinsic to the second switching element.

9. The group of claim 5, each of the plurality of interconnected DC link converters further comprising a second inductor connected between the second switching element and the second terminal.

10. The group of claim 5, each of the plurality of interconnected DC link converters further comprising a flyback diode connected between a connection between the first inductor and the first switching element and a connection between the second inductor and the second switching element.

11. The group of claim 1, wherein the first diode connected in parallel with the first switching element is intrinsic to the first switching element.

12. The group of claim 1, wherein the input-side rectifier is constructed as an uncontrolled rectifier.

13. The group of claim 11, each of the plurality of interconnected DC link converters further comprising a first inductor connected between the first switching element and the first termnal.

14. The group of claim 1, each of the plurality of interconnected DC link converters further comprising a flyback diode connected between a connection between the first inductor and the first switching element and the second terminal.

* * * * *

UNITED STATES PATENT AND TRADEMARK OFFICE
CERTIFICATE OF CORRECTION

Page 1 of 1

PATENT NO. : 11,342,860 B2
APPLICATION NO. : 16/767399
DATED : May 24, 2022
INVENTOR(S) : Robert Lange and Marco Seja It is certified that error appears in the above-identified patent and that said Letters Patent is hereby corrected as shown below:

On the Title Page
Item (30) Foreign Application Priority Data replace "EP 17203953" with --EP 17203953.9--.

In the Claims
In Column 11, Claim 1, Line 6 replace "compilsed" with --comprised--.
In Column 11, Claim 1, Line 12 replace "innut" with --input--.
In Column 11, Claim 1, Line 18 replace "vdtage" with --voltage--.
In Column 11, Claim 1, Line 27 delete a "," after "are".
In Column 11, Claim 1, Line 31 replace "enemy" with --energy--.
In Column 12, Claim 5, Line 4 insert a --,-- after "terminal".
In Column 13, Claim 7, Line 37 replace "claim 11" with --claim 1- --.
In Column 13, Claim 7, Line 40 replace "termnal"" with --terminal--.

Signed and Sealed this
Second Day of August, 2022

Katherine Kelly Vidal
*Director of the United States Patent and Trademark Office*